United States Patent [19]

Duff et al.

[11] Patent Number: 5,546,073

[45] Date of Patent: Aug. 13, 1996

[54] SYSTEM FOR MONITORING THE OPERATION OF A COMPRESSOR UNIT

[75] Inventors: Paul J. Duff, Lebanon; John P. Larson, Burlington, both of Conn.; Joseph B. Lechtanski, Castle Rock, Colo.

[73] Assignee: Carrier Corporation, Syracuse, N.Y.

[21] Appl. No.: 426,828

[22] Filed: Apr. 21, 1995

[51] Int. Cl.⁶ .................................................. G08B 21/00
[52] U.S. Cl. ............................ 340/585; 62/125; 62/129; 165/11.1; 340/584; 340/606; 340/648; 340/664
[58] Field of Search ...................................... 340/585, 584, 340/606, 648, 664, 675; 62/129, 125; 165/11.1

[56] References Cited

U.S. PATENT DOCUMENTS 4,307,775  12/1981  Saunders et al. ..................... 165/11.1

*Primary Examiner*—Glen Swann

[57] ABSTRACT

The electrical current drawn by a drive motor for the compressor unit of a chiller is monitored relative to a real time alarm limit for this electrical current. The real time alarm limit is computed from time to time by a microprocessor. The value of the computed alarm limit will vary with the cooling load being experienced by the chiller's evaporator unit.

12 Claims, 4 Drawing Sheets

5,546,073

SYSTEM FOR MONITORING THE OPERATION OF A COMPRESSOR UNIT

BACKGROUND OF THE INVENTION

This invention relates to monitoring the operation of a component within a chiller system. In particular, this invention relates to monitoring the operation of a compressor unit within a chiller system.

Compressor units within a chiller system must be capable of responding to different levels of cooling demand placed upon the chiller system. During the peak cooling season, these units will be called upon to run for extended periods of time at their maximum respective cooling capacities. During the off season, these same units will usually run for far shorter periods of time at less than their maximum rated capacities.

It is important to monitor the efficiency of the compressor units through out the calendar year. In this regard, any increase in electrical power consumption by the drive motors for the compressor units should be noted in a timely fashion. It has heretofore been common to closely monitor the electrical power consumption of these motors during the peak cooling season and detect any unusual increase in electrical power consumption during these peak demand periods.

It would be desirable to monitor electrical power consumption throughout the year and immediately detect any abnormal variations in power consumption. Any abnormal variation in power consumption that is detected during the off season could be investigated with any servicing or repair of the drive motor or compressor units being done with minimal or no disruption to the cooling provided by the chiller system.

OBJECTS OF THE INVENTION

It is an object of the invention to provide an alarm system for a chiller which automatically detects abnormal consumption of electrical power by a compressor unit in a timely fashion.

SUMMARY OF THE INVENTION

The above and other objects are achieved by providing an alarm system for the compressor unit of a chiller system which monitors the electrical current being drawn by the drive motor for the compressor unit. The alarm system applies an alarm limit to the monitored electrical current. The alarm limit that is applied will vary with the cooling load being experienced by the chiller system and will rise as the cooling load increases. In accordance with the invention, the cooling load being experienced by the system is computed first. The alarm limit for this computed cooling load is thereafter computed in accordance with a predefined functional relationship between alarm limit and cooling load. An alarm is generated when the electrical current exceeds the computed alarm limit.

The predefined functional relationship of alarm limit versus cooling load is preferably linear for a substantial range of computed cooling loads. The slope of this linear relationship is determined by noting drive motor electrical current levels at two different cooling load conditions. For instance, the drive motor electrical current level at a high cooling load condition and a significantly lower cooling load condition can be used to define the slope of a straight line between these two data points. Any further deviation that is deemed permissible above the line drawn through the data points can be added as a constant to the data points so as to arrive at a linearly varying alarm limit for an appreciable range of cooling load conditions.

BRIEF DESCRIPTION OF THE DRAWINGS

Other objects and advantages of the present invention will be apparent from the following description in conjunction with the accompanying drawings in which:

FIG. 1 illustrates a chiller system having a refrigerant loop including a compressor unit, a condenser unit and an evaporator unit for chilling water passing there through;

DESCRIPTION OF THE PREFERRED EMBODIMENT

Figure 1:
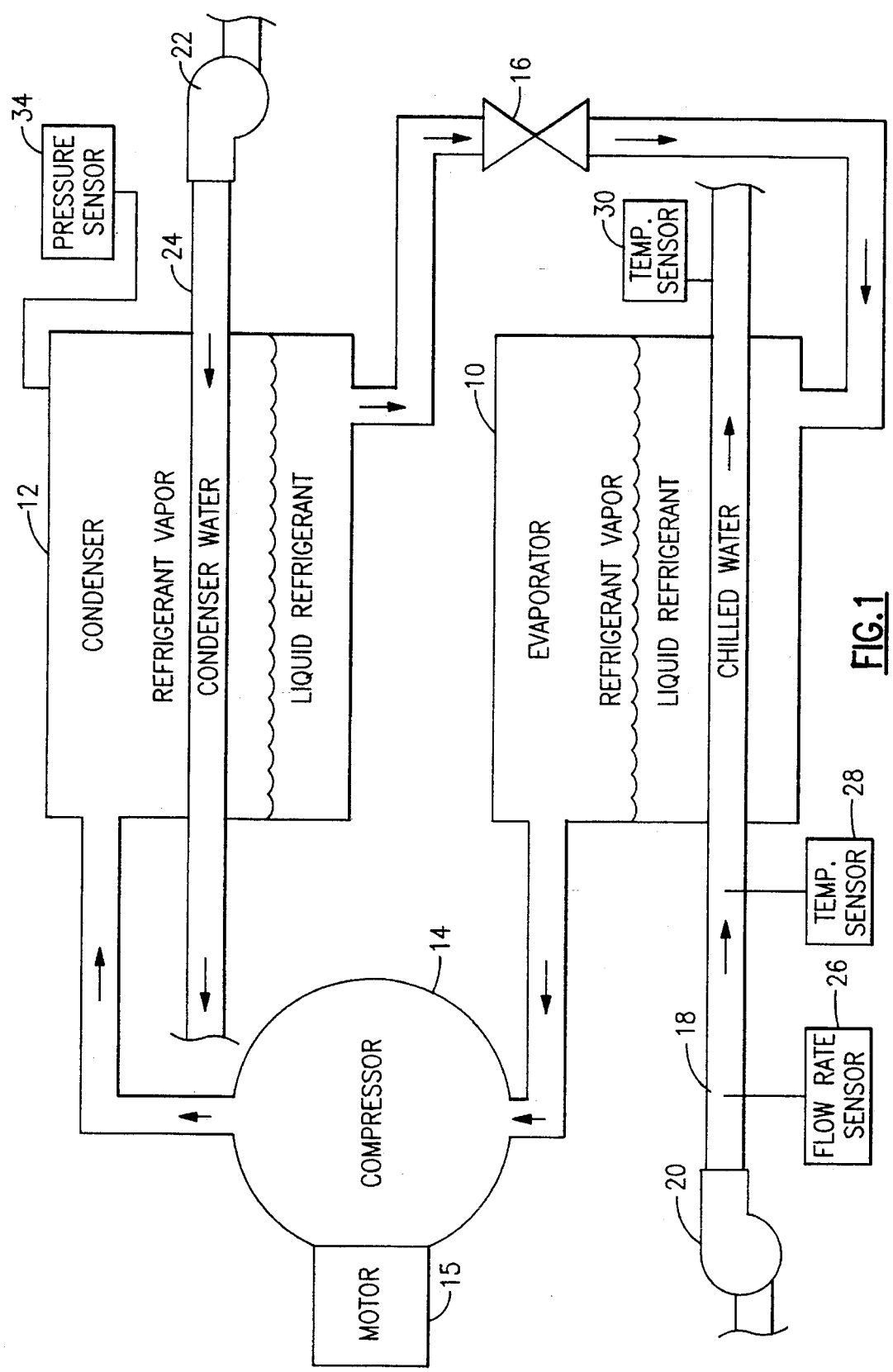

Referring to FIG. 1, a chiller system is seen to include an evaporator unit 10, a condenser unit 12, and a compressor unit 14. Refrigerant from the compressor unit 14 enters the condenser unit 12 before passing through a flow control metering device 16 to the evaporator unit 10. The liquid refrigerant in the evaporator unit 10 chills water being pumped through a conduit 18 via a chilled water pump 20. The chilled water in the conduit 18 exits the evaporator unit 10 for circulation through appropriate cooling devices in for instance an office building.

It is also to be noted that condenser water is pumped by a pump 22 through tubing 24 running through the condenser unit 12. The condenser water flowing through the tubing 24 removes the heat of compression from the refrigerant in the condenser unit 12. The condenser water exiting from the condenser unit 12 is circulated through a cooling tower (not shown) before returning to the pump 22.

Referring again to the pumped water passing through the evaporator unit 10, the flow rate of this water is detected by a flow rate sensor 26. The temperature of this pumped water flowing into the evaporator unit 10 is sensed by a temperature sensor 28. The temperature of the water flowing out of the evaporator unit 10 is sensed by a temperature sensor 30. As will be explained in detail hereinafter, these sensed values will be used to calculate the cooling load being imposed on the evaporator unit at any particular point in time.

Referring again to the compressor unit 14, a motor 32 associated therewith will be activated when necessary. The motor will draw electrical current in order to drive the compressor unit 14. This electrical current is sensed by a current sensor 34. The current sensor 34 preferably generates an r.m.s. value of the alternating electrical current being drawn by one or more of the drive coils associated with a rotor within the drive motor. It is to be appreciated that the such current sensing for drive coils within electrical motors is well known in the art.

Figure 2:
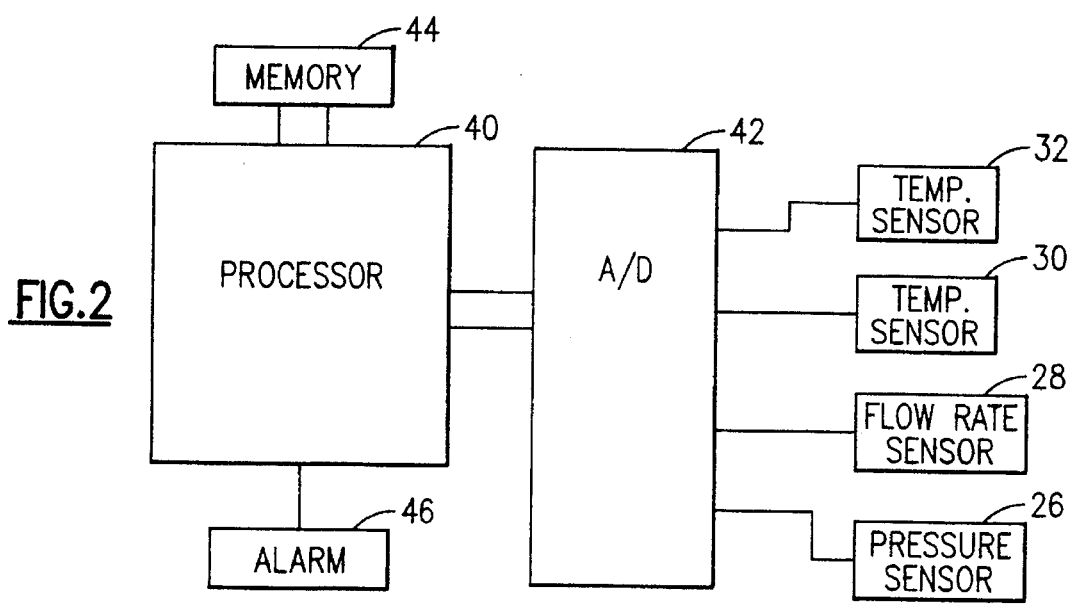
FIG. 2 illustrates an alarm monitor for monitoring the electrical current drawn by the drive motor of the compressor unit.

Referring to FIG. 2, an alarm monitoring system responsive to the drive motor electrical current sensed by the sensor 34 is illustrated. The alarm monitor system is seen to include a microprocessor 40 receiving digital signals from an A/D converter circuit 42. The analog to digital converter circuit 42 digitizes analog signals from the sensors 26, 28, 30 and 34. As will be explained in detail hereinafter, the microprocessor 40 computes a cooling load based on the digitized values read from the sensors 26, 28 and 30. The microprocessor thereafter computes an alarm limit for the amount of electrical current that may be drawn by the drive motor. This alarm limit will be based on the computed cooling load. The actual electrical current drawn by the motor 32 will be sensed by sensor 34 and compared with this computed alarm limit. The microprocessor generates a signal to an alarm 46 when the sensed electrical current exceeds the computed alarm limit.

Figure 3:
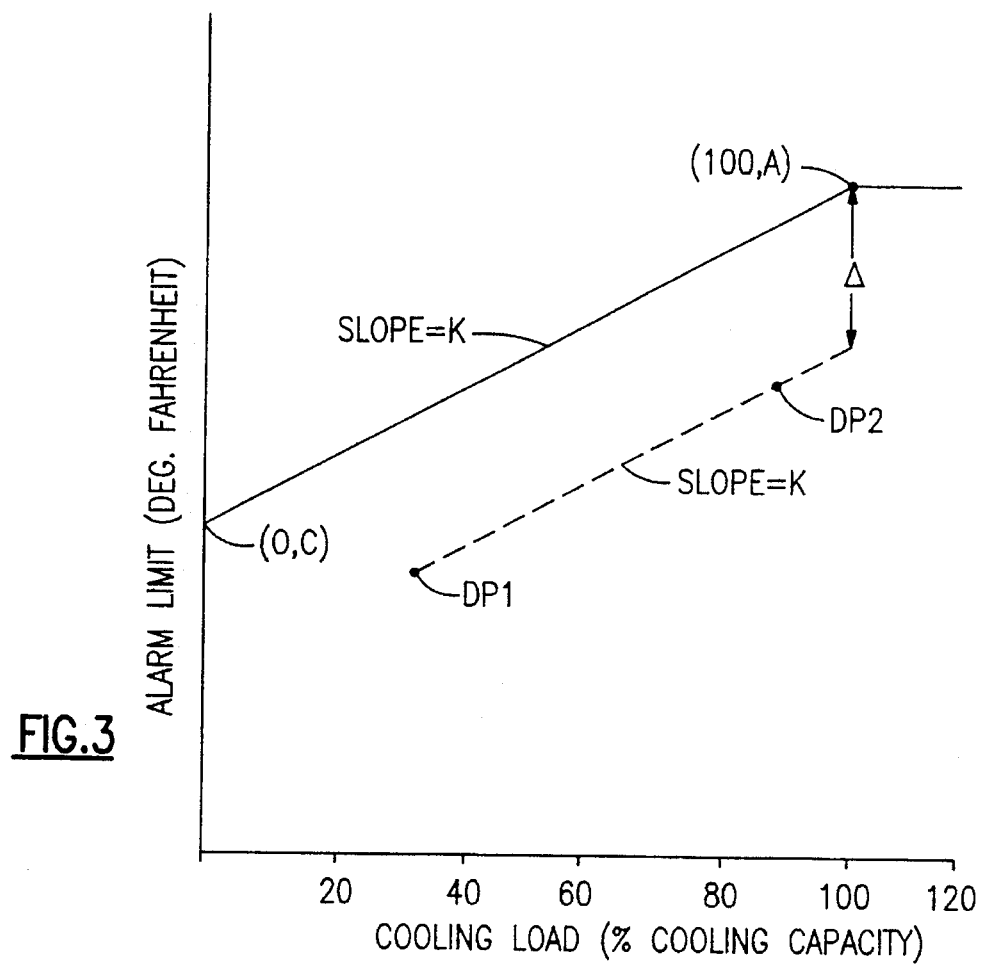
FIG. 3 is a graphical depiction of how the alarm limit for the drive motor electrical current is determined.

Referring to FIG. 3, the functional relationship of alarm limit to computed cooling load that is preferably used by the microprocessor 40 to compute the alarm limit is illustrated. The alarm limit is expressed in terms of electrical current in amperes. The computed cooling load on the evaporator unit 10 is expressed in terms of a percentage of the rated cooling capacity of the chiller system. This computed cooling load is derived by first calculating the cooling load in refrigeration tons on the evaporator unit 10 as follows:

LOAD=CWFR*(ECWT−LCWT)/(24 gpm-deg F./Ton)

where=CWFR chilled water flow rate in gallons per minute sensed by sensor 26;

where ECWT=entering chilled water temperature in degrees Fahrenheit sensed by sensor 28;

where LCWT=leaving chilled water temperature in degrees Fahrenheit sensed by sensor 30; and where the constant, 24 gpm-deg F./Ton, is derived from the definition of a refrigeration ton, the number of minutes in an hour, the specific gravity of water, and the specific heat of water as follows:

(12,000 BTU/hour/Ton)/(60 minute/hour)*(8.33 lbs/gallon)*(1 BTU/lb-deg F.))=24 gpm-deg F./Ton The resulting calculated cooling load in refrigeration tons is divided by the design cooling capacity rating for the chiller system expressed in refrigeration tons. It is to be understood that design cooling capacity ratings are well known in the art and are generally available for chiller systems.

Referring again to FIG. 3, it is noted that the alarm limit is seen to vary linearly with the computed cooling loads on the evaporator unit 10 for computed cooling loads above fifty percent of the design cooling capacity rating. This linear relationship is seen to have a slope "K" and an intercept "C" with respect to the alarm limit axis at fifty percent of design cooling capacity.

The slope "K" and the intercept "C" may be derived by first obtaining two current readings from the sensor 34 for two different cooling load conditions on the evaporator unit 10. For purposes of illustration, these two readings appear as data points DP1 and DP2 in FIG. 3. These two data points can be used to define a dotted line linear relationship in FIG. 3 of sensed electrical current expressed in amperes with respect to cooling load on the evaporator unit expressed in percentage system cooling capacity. The slope of this dotted line will be the slope "K" of the alarm limit. As noted in FIG. 3, the alarm limit is spaced at an increment of Δ above the dotted line through the data points DP1 and DP2. The increment, Δ, is preferably the difference between maximum allowable electrical current, "A", at one hundred percent design cooling capacity and the value of electrical current that would occur at this cooling load condition according to the dotted line through the data points DP1 and DP2. Stated differently, the alarm limit value, "A", at one hundred percent design cooling capacity should preferably be no more than the electrical current that would be allowed at one hundred percent cooling capacity during the peak cooling season. This upper limit is usually well known for a given drive motor configuration. It is to be appreciated that the intercept point "C" on the alarm limit axis passing through the fifty percent cooling load can be defined once the slope, "K", and the upper permissible alarm limit value, "A", at one hundred percent of design cooling capacity are known. It is also to be appreciated that the intercept point, "C", will reflect inclusion of the Δ increment as do all values of alarm limit for percentage cooling loads above fifty percent. Regarding cooling loads of less than fifty percent, the alarm limit is preferably set equal to "C".

Figure 4:
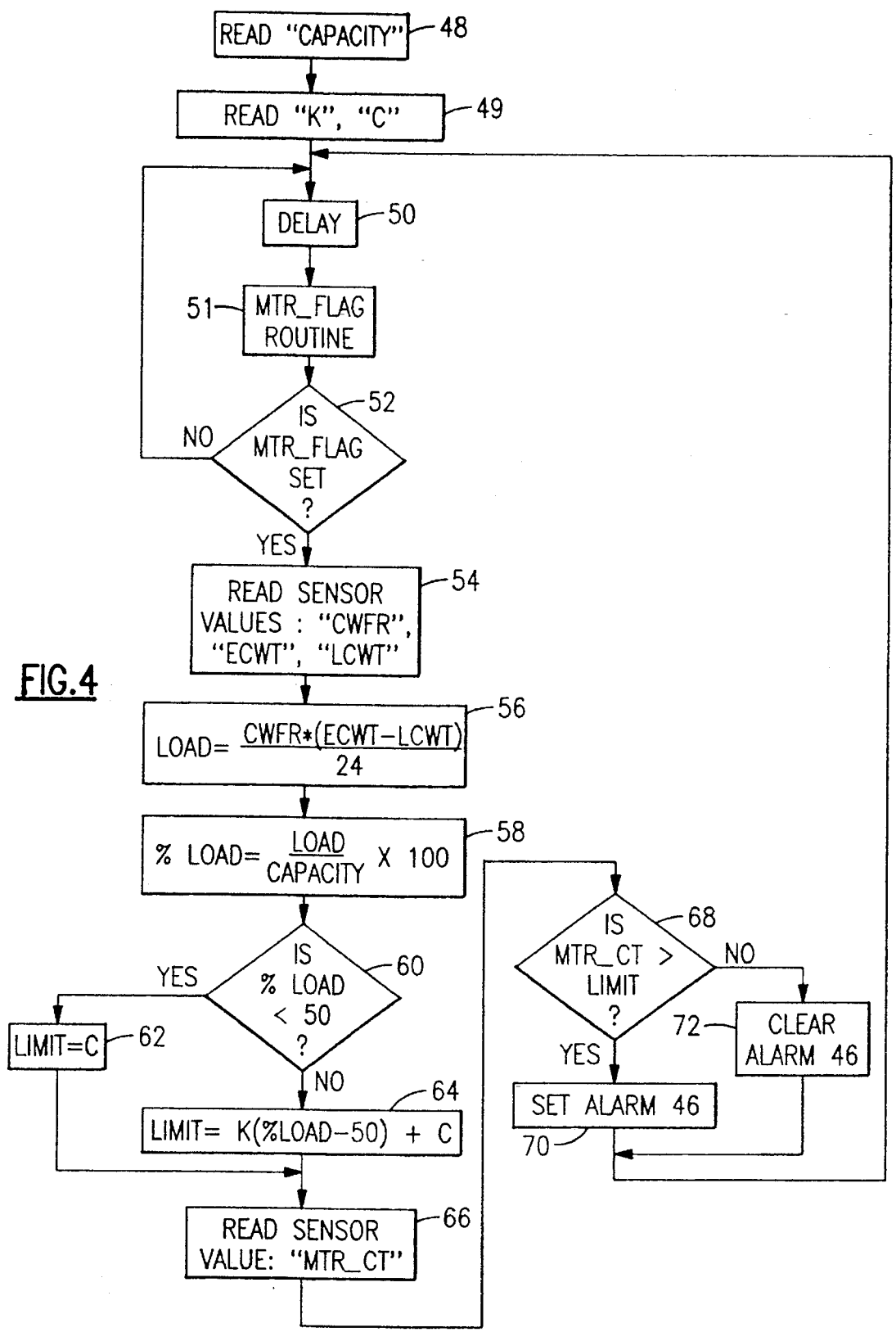
FIG. 4 illustrates an electrical current monitoring process executable by the alarm monitor of FIG. 2 which includes the alarm limit determined in FIG. 3.

Referring now to FIG. 4, the alarm limit program executed by the microprocessor 40 is illustrated in detail. The program begins with a step 48 wherein the microprocessor 40 reads the design cooling capacity rating for the chiller system that has been stored in the memory 44 as CAPACITY. The microprocessor proceeds in a step 49 to read the values for the constants "K" and "C" from the memory 44. The microprocessor now proceeds to a step 50 wherein a suitable delay is introduced before proceeding further in the alarm limit program. It is to be appreciated that the delay may be used by the microprocessor 40 to execute any number of other control programs before returning to the particular alarm monitor program. Following the timing out of the delay in step 50, the microprocessor proceeds to a step 51 and executes a MTR_FLAG routine. As will be explained in detail hereinafter, the MTR_FLAG routine sets a MTR_FLAG only if the motor 32 for the compressor unit 14 has been running for a predetermined period of time. The predetermined period of time must be sufficient to assure that the chiller system has reached a steady state operating condition following activation of the motor 32. The microprocessor will proceed from the MTR_FLAG routine to step 52 and inquire as to whether the MTR_FLAG has been set. If the MTR_FLAG is not set, the microprocessor will return to step 50 and again execute the delay required by this step. Referring again to step 52, if the MTR_FLAG is set, the microprocessor will proceed to read digitized sensor values for chilled water flow rate, CWFR, entering chilled water temperature, ECWT, and leaving chilled water temperature, LCWT, in a step 54. It is to be understood that the chilled water flow rate value, CWFR, is originally produced by the flow rate sensor 26 and is digitized in a manner well known in the art by the A/D circuit 42. In a similar fashion, ECWT originates at the sensor 28 and LCWT originates at sensor 30. The microprocessor proceeds in a step 56 to compute the cooling load on the evaporator unit 10 in refrigeration tons. The microprocessor next proceeds in a step 58 to compute what percentage of CAPACITY is represented by the computed cooling load of step 56. The microprocessor next inquires in a step 60 as to whether the percentage cooling load computed in step 58 is less than fifty percent. If the percentage cooling load is less than fifty percent, the microprocessor will set the alarm limit equal to "C" in step 62. If the percentage cooling load is equal to or greater than fifty percent, the microprocessor will compute the alarm limit in a step 64. Referring to step 64, the alarm limit is computed by multiplying the resultant cooling load expressed in terms of percentage of CAPACITY from step 58 minus tiny by the constant K and adding the constant C thereto. This alarm limit computation is in accordance with the linear functional relationship set forth in FIG. 3. The microprocessor next proceeds in a step 66 to read the digitized sensor value of drive motor current, MTR_CT, from the sensor 34 via the A/D circuit 42. The thus read value of drive motor current is compared with the alarm limit of either step 62 or step 64 in a step 68. In the event that the alarm limit is exceeded, the microprocessor proceeds to a step 70 and sets the alarm 46. If the digital value of drive motor current is less than the alarm limit, the microprocessor proceeds out of step 68 to a step 72 and clears the alarm 46. The alarm 46 may be either a display which displays a warning or an audible alarm on a control panel for the chiller system. The microprocessor next returns to step 50 wherein the delay is again introduced before proceeding to the MTR_FLAG routine. It is to be appreciated that the alarm limit program of FIG. 4 will continuously calculate the alarm limit based on the particular percentage cooling load of design cooling capacity being experienced by the evaporator unit 10 as long as the MTR_FLAG remains set. In this manner, the alarm limit will consistently be adjusted for any cooling load being experienced at the evaporator unit 10 that is greater than fifty percent of design cooling capacity. An alarm will be generated when the alarm limit is exceeded..

Figure 5:
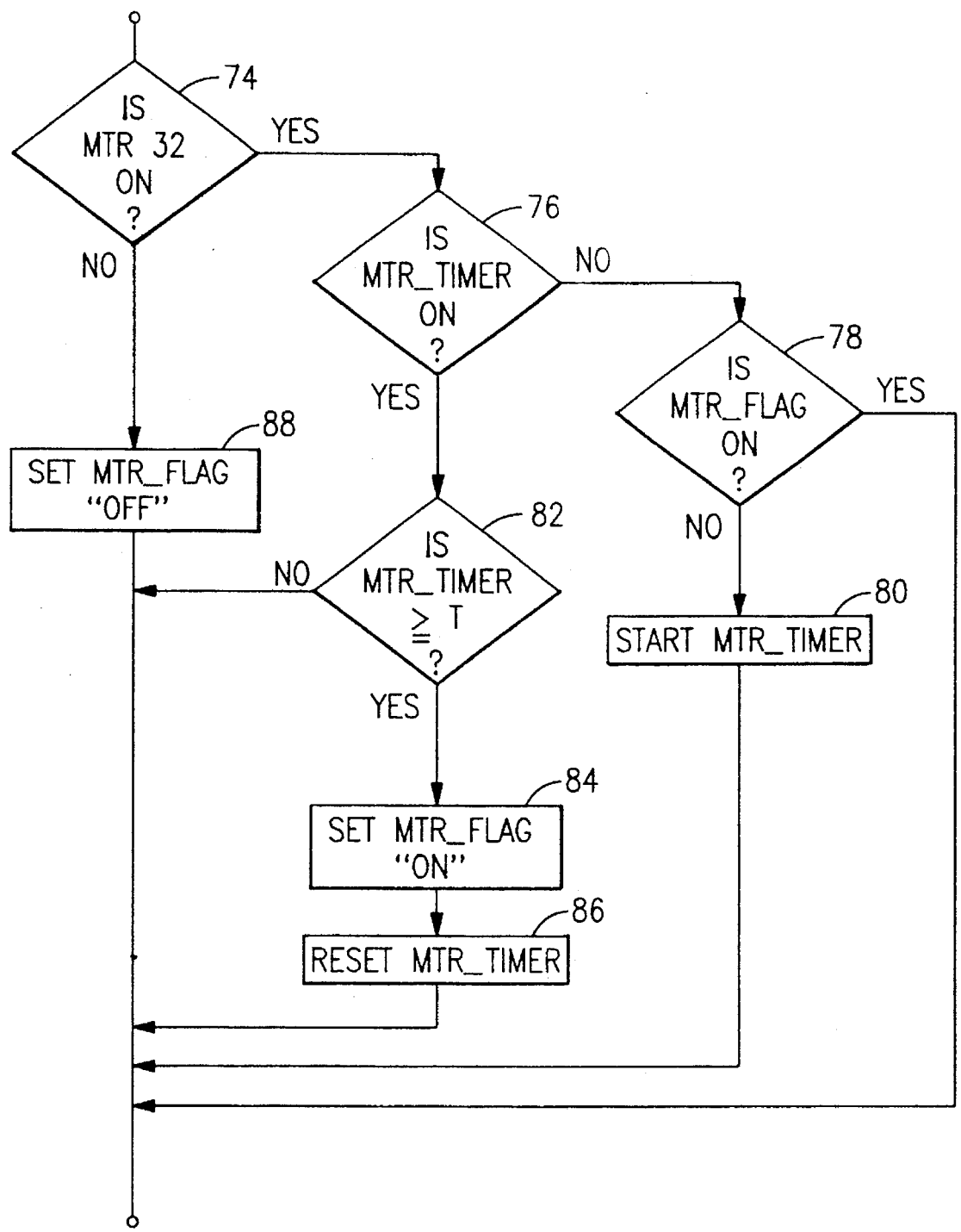
FIG. 5 illustrates a routine executable by the alarm monitor of FIG. 2 in conjunction with the electrical current monitoring process of FIG. 4.

Referring to FIG. 5, the MTR_FLAG routine is illustrated. This routine begins with a step 74 which inquires as to whether the motor 32 is on. It is to be appreciated that the motor 32 will usually be activated by a control process separately executed by the microprocessor 40. Any such active "on" command from the control process will be duly noted in step 74. If the motor is on, the microprocessor will proceed to a step 76 and inquire as to whether a MTR TIMER is on. The MTR_TIMER will initially be off if the motor 32 has just been activated by the control process. The microprocessor will hence proceed from step 76 to step 78 and inquire as to whether the MTR_FLAG is on. The MTR_FLAG will be initially off prompting the microprocessor to proceed to a step 80 and start the MTR_TIMER. The microprocessor will exit the MTR_FLAG routine and inquire in step 52 as to whether the MTR_FLAG has been set. Since the MTR_FLAG is not set, the microprocessor will proceed back to step 50. Following the delay instituted in step 50, the microprocessor will return to the MTR_ FLAG routine and again inquire as to whether the motor 32 is on. Assuming the motor 32 continues to be on, the microprocessor will proceed to note the MTR_TIMER is on in step 76 prompting an inquiry in step 82 as to whether the MTR_TIMER is greater than a predetermined time, "T". The time "T" will define the amount of time that the chiller system must take to reach a steady state operating level following activation of the motor 32. Until the MTR_ TIMER equals or exceeds this time, the microprocessor will simply exit from the MTR_FLAG routine without setting the MTR_FLAG. When MTR_TIMER does however exceed the predetermined time, "T", the microprocessor will proceed to step 84 and set the MTR_FLAG. The microprocessor will thereafter reset the MTR_TIMER in step 86 before exiting the MTR_FLAG routine. It is to be appreciated that the microprocessor will proceed to note that the MTR_FLAG has been set in step 52, prompting execution of the alarm monitoring steps of FIG. 4. The alarm monitoring will continue to occur until such time as the MTR_ FLAG routine notes in step 74 that the motor 32 is no longer on prompting the microprocessor to set the MTR_FLAG to an off status in step 88.

It is to be appreciated that a particular embodiment of the invention has been described. Alterations, modifications and improvements thereto may readily occur to those skilled in the art. For instance, a nonlinear alarm limit could also be used in the alarm limit program of FIG. 4. A drive motor for a compressor exhibiting such a nonlinear behavior could be appropriately tested with a curve being generated from the data. Any permissible increment of electrical current could be added to the generated curve. The appropriate mathematical expression for the nonlinear curve could be generated for use by the alarm monitor program. Accordingly the foregoing description is by way of example only and the invention is to be limited only by the following claims and equivalents thereto.

What is claimed is:

1. A system for monitoring the electrical current drawn by a drive motor for a compressor unit of a chiller that includes an evaporator unit with a heat exchange medium passing therethrough, said system comprising:

an electrical current sensor for sensing the electrical current drawn by the drive motor for the compressor unit;

means for computing a real time alarm limit for the electrical current drawn by the drive motor for the compressor unit based upon the flow rate of the heat exchange medium passing through the evaporator unit, the temperature of the heat exchange medium entering the evaporator unit and the temperature of the heat exchange medium leaving the evaporator unit under a real time cooling load condition being experienced by the chiller;

means for comparing the sensed electrical current drawn by the drive motor unit with the computed real time alarm limit for the electrical current drawn by the drive motor; and means for generating a warning when the sensed electrical current drawn by the drive motor exceeds the computed real time alarm limit.

2. The system of claim 1 wherein the chiller includes an evaporator unit with a heat exchange medium passing there through, and wherein said means for computing a real time alarm limit for the electrical current drawn by the drive motor comprises:

means for sensing the flow rate of the heat exchange medium passing through the evaporator unit;

means for sensing the temperature of the heat exchange medium entering the evaporator unit;

means for sensing the temperature of the heat exchange medium leaving the evaporator unit;

means for computing a cooling load on the evaporator unit as a function of the flowrate of the heat exchange medium, temperature of the heat exchange medium entering the evaporator unit, and the temperature of the heat exchange medium leaving the evaporator unit; and means for computing an alarm limit value for the electrical current drawn by the drive motor as a function of the computed cooling load on the evaporator unit.

3. The system of claim 2 wherein said means for computing an alarm limit for electrical current drawn by the drive motor using the computed cooling load on the evaporator unit comprises:

means for multiplying the computed cooling load by a first constant and adding a second constant to the resulting product wherein a portion of the second constant includes a permitted variance from the normal electrical current drawn by the drive motor at the computed cooling load.

4. The system of claim 3 wherein said means for computing an alarm limit for electrical current drawn by the drive motor using the computed cooling load on the evaporator unit comprises:

means for dividing the computed cooling load on the evaporator unit by a cooling capacity rating for the chiller so as to generate a ratio of computed cooling load to rated cooling capacity of the chiller; and means for multiplying the ratio of computed cooling load to rated cooling capacity by a first constant and adding a second constant to the resulting product wherein a portion of the second constant includes a permitted variance from the normal electrical current drawn by the drive motor at the computed cooling load.

5. The system of claim 2 wherein said means for computing an alarm limit for electrical current drawn by the drive motor as a function of the computed cooling load on the evaporator unit comprises:

means for dividing the computed cooling load on the evaporator unit by a cooling capacity rating for the chiller so as to generate a ratio of computed cooling load to rated cooling capacity of the chiller;

means for determining whether the ratio of computed cooling load to rated cooling capacity is less than the predetermined numerical value;

means for setting the alarm limit equal to a constant amount of electrical current that may be drawn by the drive motor when the ratio of computed cooling load to rated cooling capacity is less than the predetermined numerical value; and means for computing an alarm limit for electrical current drawn by the drive motor as a function of the ratio of computed cooling load to rated cooling capacity of the chiller when the ratio of computed cooling load to rated cooling capacity is greater than the predetermined numerical value.

6. The system of claim 5 wherein said means for computing an alarm limit for electrical current drawn by the drive motor comprises:

means for multiplying the ratio of computed cooling load to rated cooling capacity minus the predetermined value by a first constant and adding a second constant to the resulting product wherein a portion of said second constant includes a permitted variance from the normal electrical current drawn by the drive motor at the computed cooling load.

7. A process for monitoring the electrical current drawn by a drive motor for a compressor unit of a chiller that includes an evaporator unit with a heat exchange medium passing therethrough, said process comprising the steps of:

sensing the electrical current drawn by the drive motor for the compressor unit;

computing a real time alarm limit for the electrical current drawn by the drive motor based upon sensing the flow rate of the heat exchange medium passing through the evaporator unit, the temperature of the heat exchange medium entering the evaporator unit and the temperature of the heat exchange medium leaving the evaporator unit under a real time cooling load condition being experienced by the chiller;

comparing the sensed electrical current drawn by the drive motor with the computed real time alarm limit for the electrical current drawn by the drive motor; and generating a warning when the sensed electrical current drawn by the drive motor exceeds the computed real time limit.

8. The process of claim 7 wherein the chiller includes an evaporator unit with a heat exchange medium passing there through, and wherein said step of computing a real time alarm limit for the electrical current drawn by the drive motor comprises the steps of:

sensing the flow rate of the heat exchange medium passing through the evaporator unit;

sensing the temperature of the heat exchange medium entering the evaporator unit;

sensing the temperature of the heat exchange medium leaving the evaporator unit;

computing a cooling load on the evaporator unit as a function of the flowrate of the heat exchange medium, temperature of the heat exchange medium entering the evaporator unit, and the temperature of the heat exchange medium leaving the evaporator unit; and computing an alarm limit value for electrical current drawn by the drive motor using the computed cooling load on the evaporator unit.

9. The process of claim 8 wherein said step of computing an alarm limit for electrical current drawn by the drive motor using the computed cooling load on the evaporator unit comprises the step of:

multiplying the computed cooling load by a first constant and adding a second constant to the resulting product wherein a portion of the second constant includes a permitted variance from the normal electrical current drawn by the drive motor at the computed cooling load.

10. The process of claim 9 wherein said step of computing an alarm limit for electrical current drawn by the drive motor using the computed cooling load on the evaporator unit comprises the steps of:

dividing the computed cooling load on the evaporator unit by a cooling capacity rating for the chiller so as to generate a ratio of computed cooling load to rated cooling capacity of the chiller; and multiplying the ratio of computed cooling load to rated cooling capacity minus the predetermined value by a first constant and adding a second constant to the resulting product wherein a portion of the second constant includes a permitted variance from the normal electrical current drawn by the drive motor at the computed cooling load.

11. The process of claim 8 wherein said step of computing an alarm limit for electrical current drawn by the drive motor as a function of the computed cooling load on the evaporator unit comprises the steps of:

dividing the computed cooling load on the evaporator unit by a cooling capacity rating for the chiller so as to generate a ratio of computed cooling load to rated cooling capacity of the chiller;

determining whether the ratio of computed cooling load to rated cooling capacity is greater than a predetermined numerical value;

setting the alarm limit equal to a constant amount of electrical current value that may be drawn by the drive motor when the ratio of computed cooling load to rated cooling capacity is greater than the predetermined numerical value; and computing an alarm limit for electrical current drawn by the drive motor as a function of the ratio of computed cooling load to rated cooling capacity of the chiller when the ratio of computed cooling load to rated cooling capacity is greater than the predetermined numerical value.

12. The process of claim 11 wherein said step of computing an alarm limit for electrical current drawn by the drive motor comprises the steps of:

multiplying the ratio of computed cooling load to rated cooling capacity minus the predetermined value by a first constant and adding a second constant to the resulting product wherein a portion of said second constant includes a permitted variance from the normal electrical current drawn by the motor at the computed cooling load.

* * * * *